(12) United States Patent
Seymour

(10) Patent No.: US 8,240,049 B2
(45) Date of Patent: Aug. 14, 2012

(54) TUBE STUB REMOVAL APPARATUS

(75) Inventor: Michael J. Seymour, Akron, OH (US)

(73) Assignee: Babcock & Wilcox Power Generation Group, Inc.

( * ) Notice: Subject to any disclaimer, the term of this patent is extended or adjusted under 35 U.S.C. 154(b) by 754 days.

(21) Appl. No.: 12/354,468

(22) Filed: Jan. 15, 2009

(65) Prior Publication Data

US 2009/0229128 A1    Sep. 17, 2009

Related U.S. Application Data

(60) Provisional application No. 61/036,790, filed on Mar. 14, 2008.

(51) Int. Cl.
*B23P 6/00* (2006.01)

(52) U.S. Cl. .................................................. 29/890.031
(58) Field of Classification Search ............. 29/890.031, 29/252; 219/635
See application file for complete search history.

(56) References Cited

U.S. PATENT DOCUMENTS

| | | | |
|---|---|---|---|
| 6,285,014 B1 * | 9/2001 | Beck et al. ..................... | 219/644 |
| 7,297,908 B2 * | 11/2007 | Yoshida et al. ............... | 219/635 |
| 7,565,727 B2 * | 7/2009 | Blaser et al. ................ | 29/402.01 |

* cited by examiner

*Primary Examiner* — David Bryant
*Assistant Examiner* — Moshe Wilensky
(74) *Attorney, Agent, or Firm* — Michael J. Seymour; Eric Marich

(57) ABSTRACT

An improved apparatus and method of removing tubes and/or tube stubs from structures comprising multiple tubes wherein induction heating is utilized to heat the tube stub prior to removal.

5 Claims, 6 Drawing Sheets

TUBE STUB REMOVAL APPARATUS

This application claims priority to provisional application 61/036,790 filed Mar. 14, 2008.

FIELD AND BACKGROUND OF INVENTION

The present invention relates generally to the field of tube extraction, and more particularly to an improved apparatus and method of removing tubes and/or tube stubs from structures comprising multiple tubes, such as boilers, condensers, evaporators, drums, and the like.

A typical heat exchanger comprises a pair of parallel tube sheets, a plurality of baffle plates, and a plurality of heat exchanger tubes. The tube sheets are located at the ends of the heat exchanger. The baffle plates are positioned between the tube sheets and generally parallel thereto. The tubes extend between the tube sheets and through the baffle plates and are supported by the tube sheets. The tube sheets and baffle plates have a series of aligned holes formed therein, and the tubes are inserted through these holes and then expanded in the areas of the tube sheets into fluid-tight pressure contact therewith.

In the course of normal preventative maintenance and/or repair it may be necessary to remove and replace one or more tubes from the structure. This process generally begins by cutting the tubes to form a tube stubs protruding several inches from the tube sheet. The expanded fluid tight pressure contact ends of the tube stubs are then withdrawn from the sheet by forced or deformation.

Various tools are known for removing tube stub, such as wedges that mechanically deform the tube stub, collapsing the tube inward upon itself. Anvils and hammers are also readily used to mechanically force collapsed and uncollapsed tubes out a tube sheet hole or bores.

Additional prior art tube stub removal devices include:

U.S. Pat. No. 4,355,450 to Miller discloses a tube extracting mechanism having a wedge with expandable circumferential gripping teeth.

U.S. Pat. No. 3,791,011 to Keys shows a tube pulling device with longitudinally fixed radially expanding gripping means which engages the tube wall for withdrawal of the tube from the tube sheet.

U.S. Pat. No. 3,507,028 to Stellatella shows a hydraulic tube puller with radial expansion of an inner end portion of a tube gripping member into the tube wall.

The primary problem with all these prior art structures is the imposition of expansion force on the tube precisely at the point where it is engaged with the tube sheet which can damage the metal between adjacent holes and cause the holes in the tube sheet to enlarge and not properly grip a new tube when it is expanded. Moreover, the prior art devices require multiple devices, increasing the likelihood of breakage of the removal devices, and resulting in an increase of down-time of the structure for repairs.

U.S. Ser. No. 11/762,104, herein incorporated by reference, discloses a recent innovation that overcomes many problems encountered during traditional tube stub removal. U.S. Ser. No. 11/762,104 teaches a method of tube stub removal wherein a metal tube stub is heated then subsequently elongated and circumferentially contracted for the purpose of readily removing a tube from a tube sheet. While a beneficial method over prior art, the method of Ser. No. 11/762,104 requires multiple operators thereby increasing tube removal costs and down time related to tube removal.

Accordingly, a need exists for an improved method of tube stub removal that require only a single operator and overcome deficiencies of the prior art.

The present invention improves upon the method of tube stub removal disclosed in U.S. Ser. No. 11/762,104, and provides a novel apparatus that allows a single operator to readily remove a tube stub from a tube sheet without damaging the tube sheet, in addition to the additional advantages as discussed herein.

SUMMARY OF INVENTION

It is an object of the present invention to provide an apparatus and method of tube extraction that is easy to use and does not cause damage to the tube sheet upon tube withdrawal.

A further object of the invention is to provide an apparatus and method of tube extraction enabling a single technician to quickly and effectively remove tubes having belled ends from a tube sheet.

A further object of the invention is to provide an apparatus and method of tube extraction enabling a single technician to quickly and effectively remove ribbed tubes from a tube sheet.

A further object of the invention is to provide an apparatus and method of tube extraction enabling a single technician to quickly and effectively remove ribbed tubes having belled ends from a tube sheet.

Accordingly, the present invention introduces a tube pulling apparatus comprising an induction heating coil attached to a inner ram, a outer ram concentrically surround the inner ram, and a sheath concentrically surrounding the outer ram.

The present invention further introduces a method of tube extraction comprising providing a tube pulling apparatus comprising an inner ram attached to an induction heating coil, and a outer tube ram concentrically surrounding the inner ram; placing the apparatus over a tube stub, attaching the outer ram to the tube stub, lowering the induction heating coil into the tube stub, heating the tube stub with the induction heating coil, and removing the heated tube stub from the tube drum with the outer ram.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
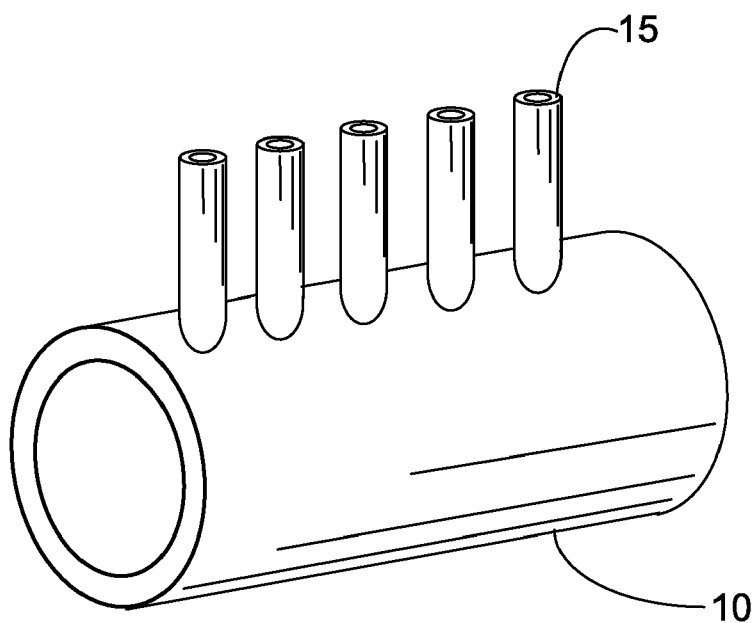
FIG. 1 is a graphical representation of a tube sheet and tube stubs.
Figure 2:
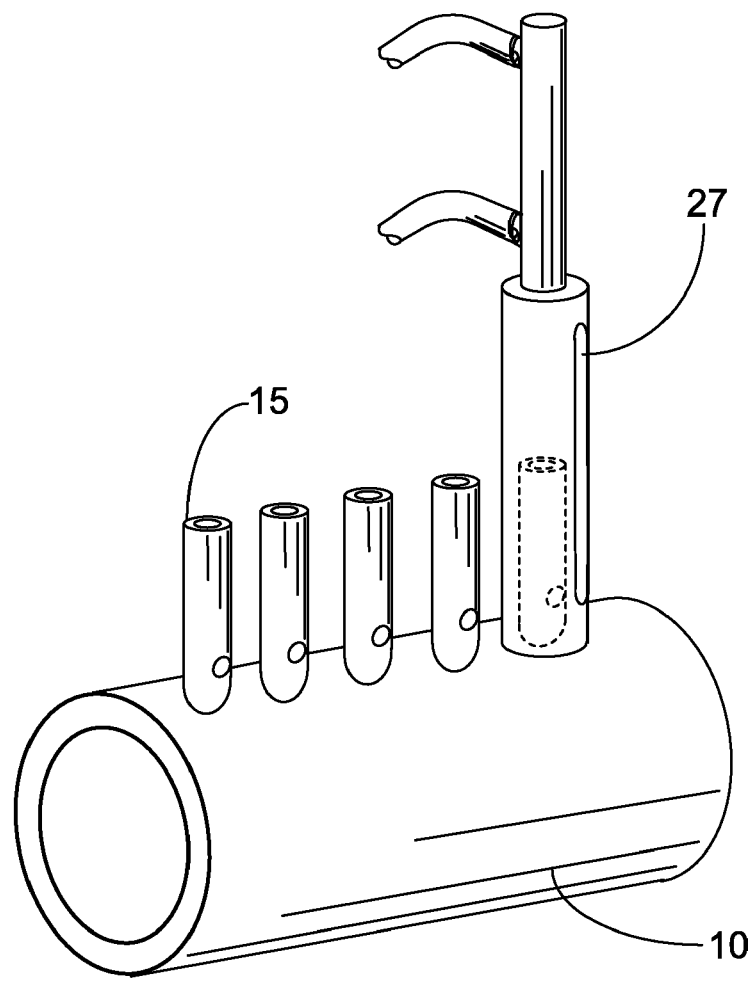
FIG. 2 is a graphical representation of a tube removal apparatus positioned over a tube stub.
Figure 4:
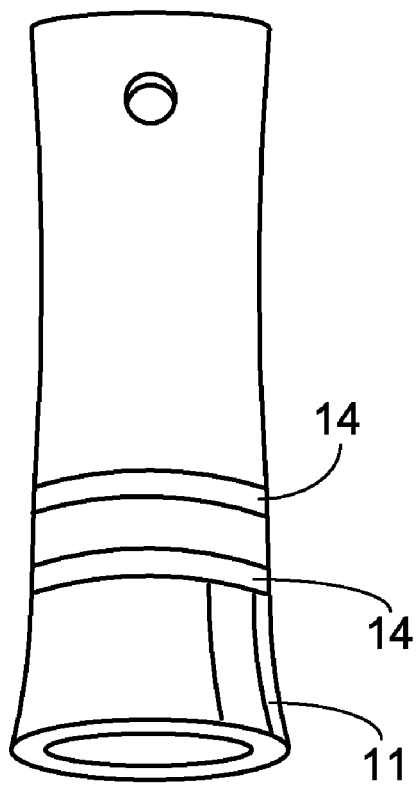
FIG. 4 is a graphical representation of an elongated tube.
Figure 5:
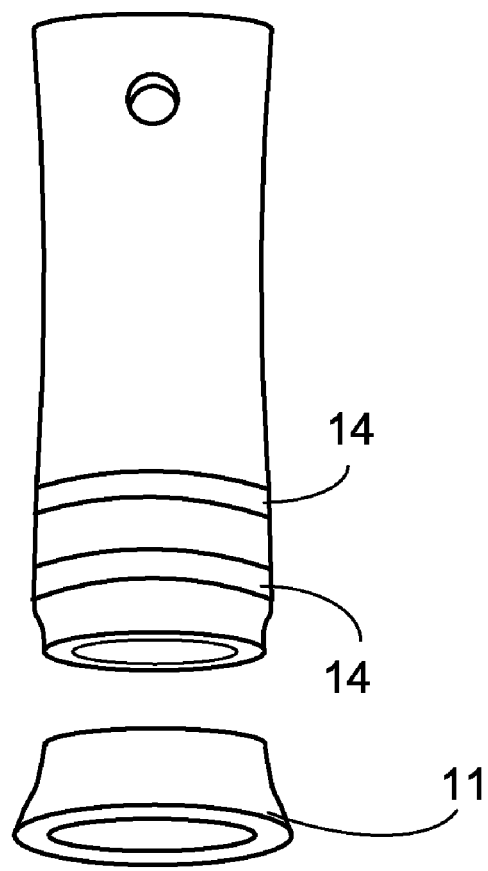
FIG. 5 is a graphical representation of an elongated tube broken between the bell and the rings.

Referring now to the drawings, in which like reference numerals are used to refer to the same or similar elements, FIG. 1 is a graphical representation of a type of tube sheet known as a tube drum 10. Tube drum 10 contains at least one tube or tube stub 15, and in many cases a plurality thereof. Tubes 15 generally extended through the wall of the tube drum 10, such that a portion of the tube 15 is circumferentially surrounded by the tube drum 10. The tube end extending in the tube drum 10 may be belled 11 (FIGS. 4, 5) as a means to secure and seal the tube 15 to the tube drum 10. Ribs 14 (FIGS. 4, 5) may also be present on the tube 15 for similar purposes.

Figure 3:
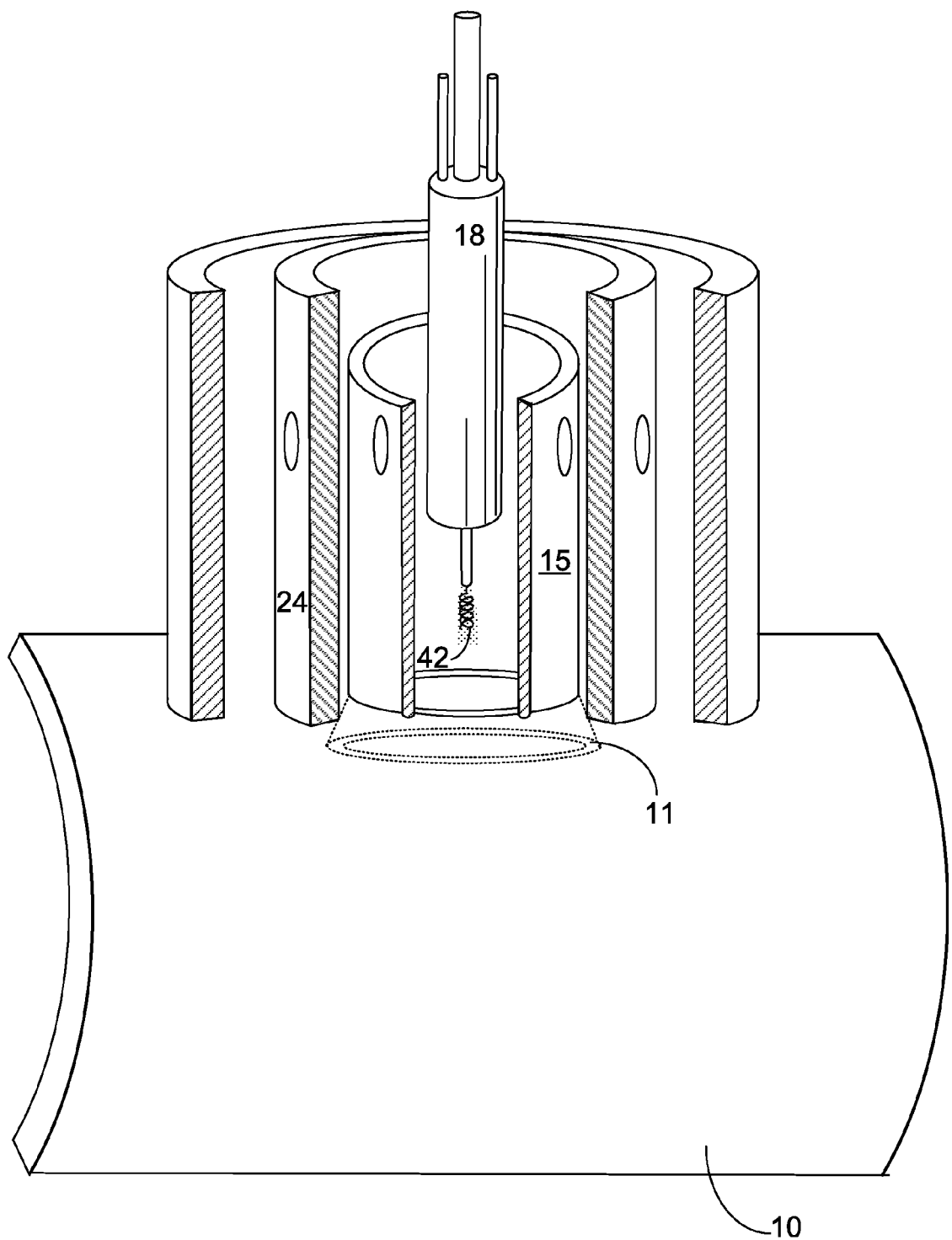
FIG. 3 is a cross sectional view of a tube removal device of the present invention positioned over a tube stub.

Referring now to FIG. 3. a cross sectional view of a tube removal apparatus 27 according to the present invention is show. The apparatus 27 comprises three distinct concentrically arranged elements, an inner ram 18, and outer ram 24, and a sheath 32.

In a first step, tube stub removal is accomplished by placing the apparatus 27 over the tube stub 22, such that inner ram 18 is capable of descending into tube stub 15 and the outer ram 24 circumferentially surrounds tube stub 15. As would be appreciated by the skilled artisan, the diameters of both the inner ram 18 and outer ram 24 can be readily adjusted to accommodate any tube stub diameter.

In a subsequent step, the inner ram 18 is lowered into, and subsequently removed from, the inner circumference of tube stub 22. The lower portion of inner ram 18 comprises an induction heating coil 42 such as the coil described in U.S. Pat. No. 6,778,057, herein incorporated by reference. Heat provide by the induction heating coil 42 rapidly elevates the temperature of the tube stub from the inside out, softening the tubes metallic structure, making it more docile.

In another step, the outer ram 24 is attached to a portion of the tube stub 15. Subsequent to induction heating outer ram 24 provides and a tensile force that elongates and removes the softened tube stub from the tube drum, or sufficiently removes the tube stub in a manner that allows an apparatus 27 operator to complete removal by hand.

Figure 6:
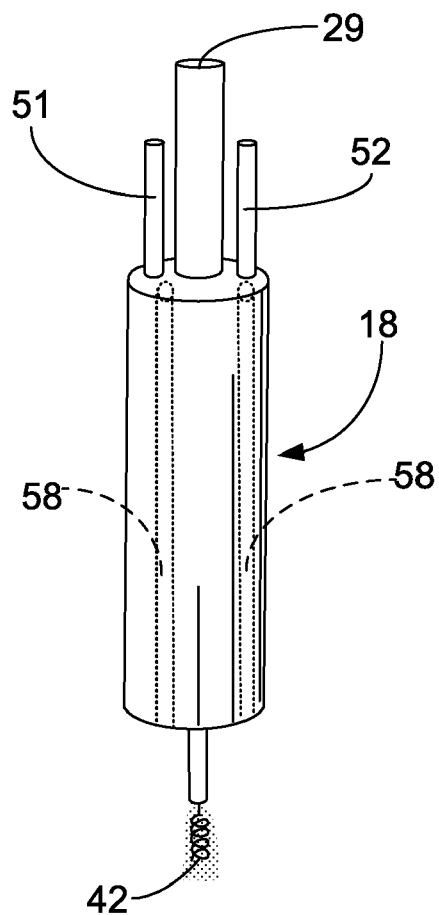
FIG. 6 is a graphical representation of an inner ram according to the present invention.
Figure 7:
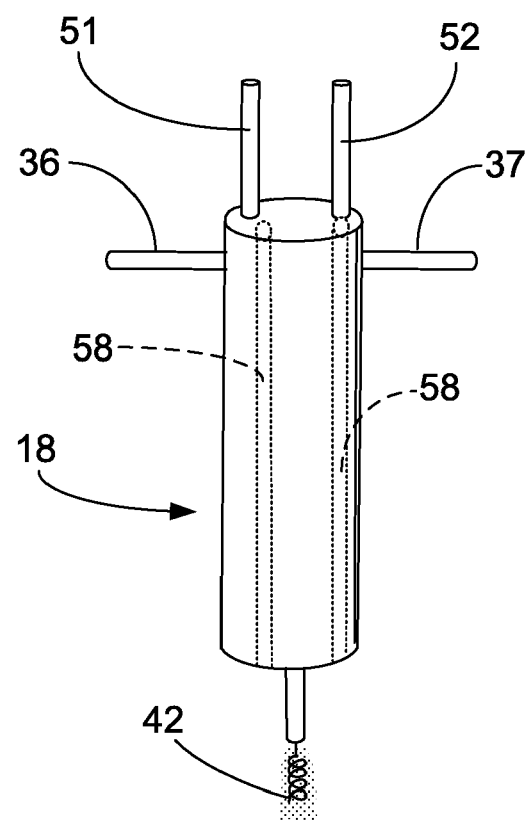
FIG. 7 is a graphical representation of an alternative embodiment of an inner ram according to the present invention.

FIGS. 6 and 7 are graphical representation of inner ram 18 embodiments according to the present invention. Movement of inner ram may be controlled electronically or hydraulically via inner ram rod 29 (FIG. 6) or manually via heating control arms 36, 37 (FIG. 7). Alternatively, movement of inner ram 18 can be controlled electronically by a combination of electronical, hydraulic or manual means.

Inner ram 18 may also be fitted with cooling fluid inlet 51 and outlet 52 to mitigate overheating. In one embodiment optional cooling channels 58 within inner ram 18 cool the inner ram 18 in addition to provide a cooling fluid to the coil. In another embodiment a stream of air is provide through the cooling channel.

Figure 8:
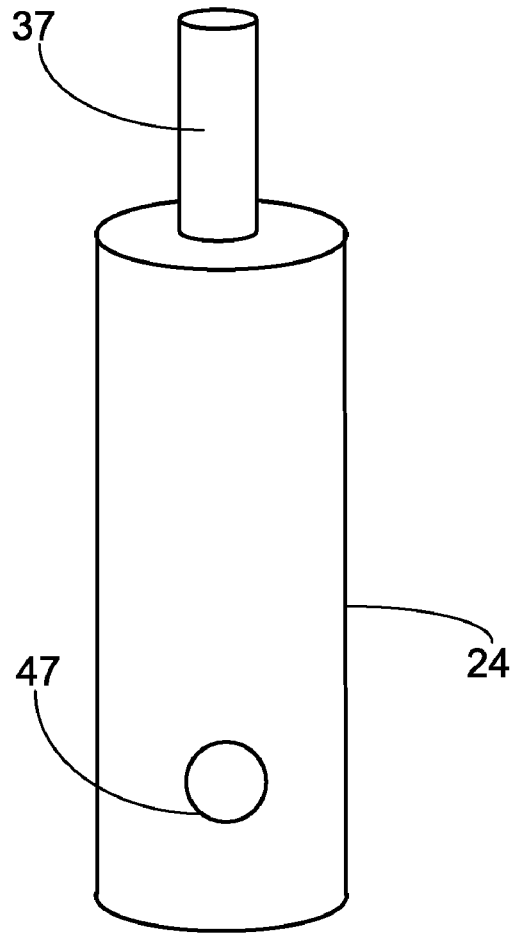
FIG. 8 is a graphical representation of an outer ram according to the present invention.
Figure 9:
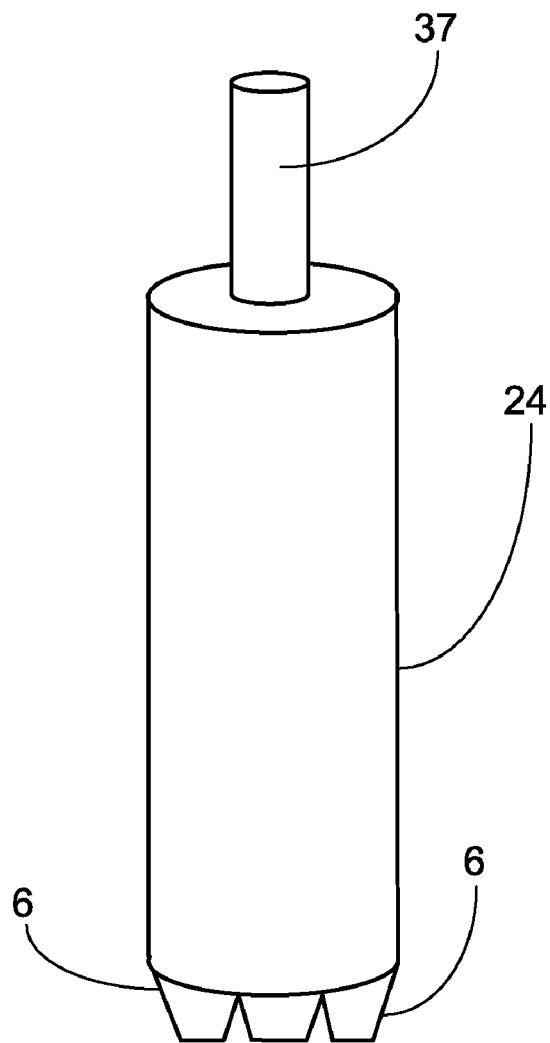
FIG. 9 is a graphical representation of an alternative embodiment of an outer ram according to the present invention.

FIGS. 8 and 9 are graphical representation of outer ram 24 embodiments according to the present invention. Movement of outer ram may be controlled electronically or hydraulically via an outer ram rod 37. Alternatively, multiple outer ram rods may control movement of out ram.

During tube stub removal, outer ram 24 is attached to tube stub 15. Attachment can occur via one or more clamps 6, or the additional step of creating one or more holes or orifices 8 in the tube stub 15 and placing a rod (not shown) though similar holes or orifices 47 in the outer ram 24.

Operation of the outer ram 24 provides tensile force to the heated tube stub, while sheath 32 provide supports for the apparatus 27 against the tube drum 10 during operation of outer ram 24. In a preferred embodiment, the elongation circumferentially reduces a portion of the tube diameter 17, allowing easy removal of the tube 15 from the tube drum 100 without damaging the tube drum 100. In an alternative embodiment heating may be localized around the belled 11, FIG. 5, and/or ribbed 14 section of tube 15, such that the elongation step tears the tube into two pieces. In this embodiment one piece of the torn tube is removed from the inside of the tube drum 10, and one piece from the outside of the tube drum 10.

Figures 10, 11:
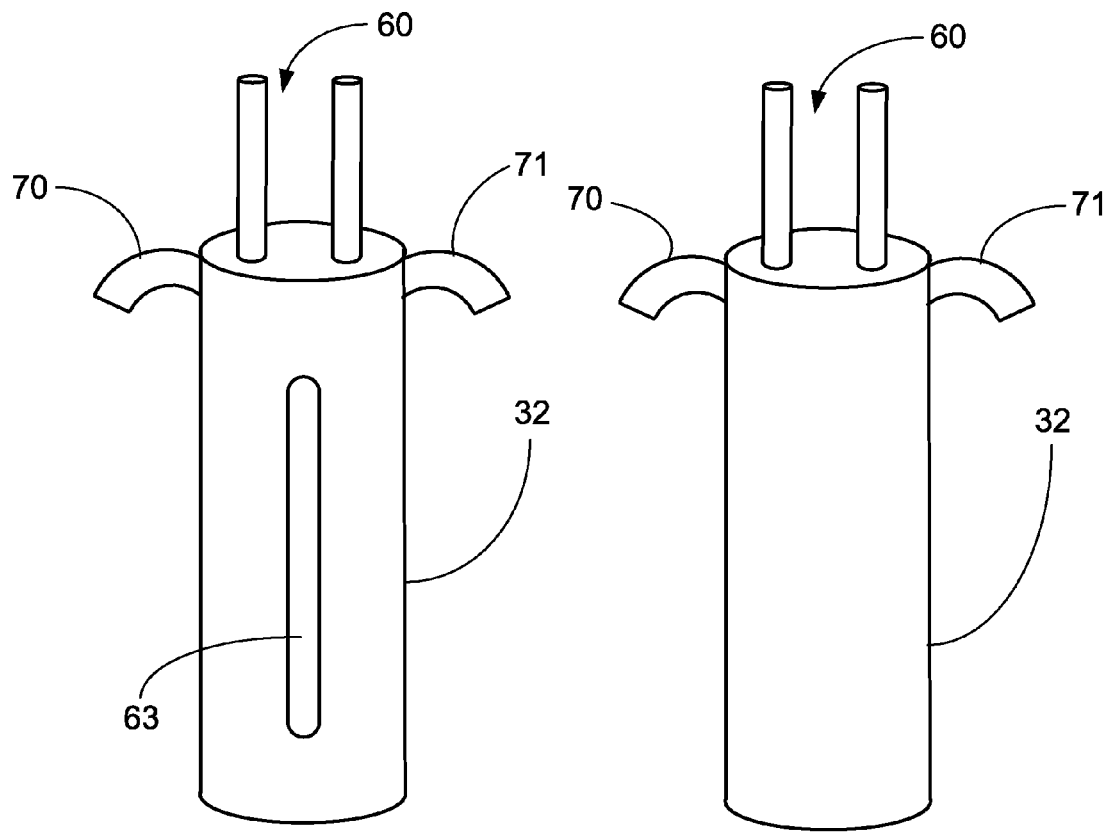
FIG. 10 is a graphical representation of an sheath according to the present invention.
FIG. 11 is a graphical representation of an alternative embodiment of a sheath according to the present invention.
Figures 12, 13:
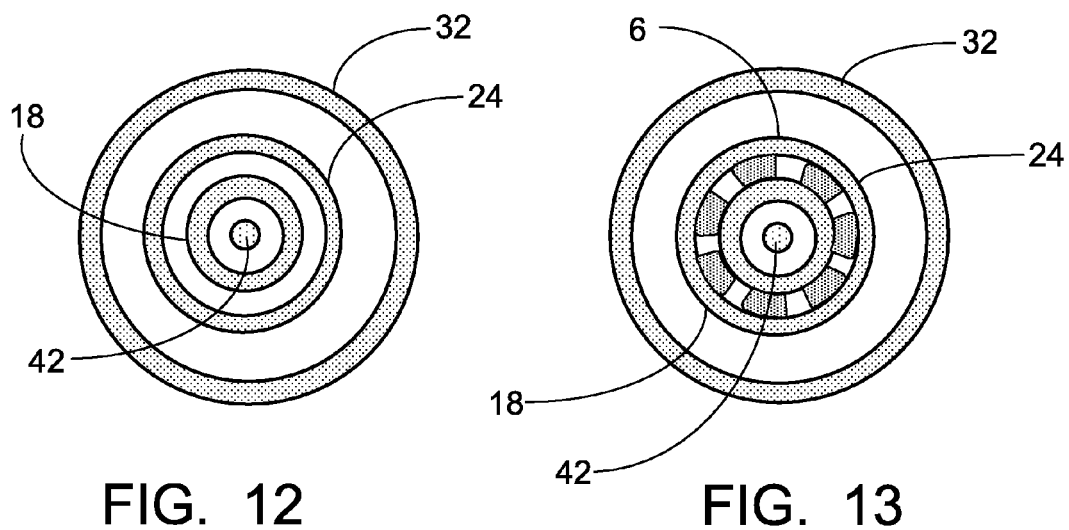
FIG. 12 is a cross sectional view of a tube stub pulling apparatus using the sheath of FIG. 10.
FIG. 13 is a cross sectional view of a tube stub pulling apparatus using the sheath of FIG. 11.

FIGS. 10 and 11 are graphical representation of sheath 32 embodiments according to the present invention. Sheath 32 provides structural support for the inner ram 18 and outer ram 24. Handles 70, 71 allow an operator to control the apparatus and may be equipped with buttons (not shown) to control the movement of inner ram 18 and outer ram 24. Lines 60 provide hydraulic fluid and/or electric current to the apparatus 27, depending on the embodiment. In some embodiments sheath 32 includes one or more a channel 63 (FIG. 10) wherein inner ram 18 control arms 36, 37 and/or a rod connecting the tube stub 15 to outer ram 24 pass there through. In other embodiments (FIG. 11) no channel is necessary. Cross sectional views of tube stub apparatus 27 embodiments utilizing FIGS. 10 and 11 sheath's 32 are shown in FIGS. 12 and 13.

While specific embodiments of the invention have been shown and described in detail to illustrate the application of the principles of the invention, it will be understood that the invention may be embodied otherwise without departing from such principles.

I claim:

1. A tube stub pulling apparatus comprising:
   an induction heating coil attached to an inner ram, an outer ram configured to pull on a tube stub and concentrically surrounding the inner ram, a sheath concentrically surrounding the outer ram, a tube pin hole in the outer ram and a tube pin channel in the sheath, a motive force to operate the outer ram, a lever arm connected to the inner ram and a lever arm channel in the sheath.

2. The tube stub pulling apparatus of claim 1, further comprising a tube clamp attached to the outer ram.

3. The tube stub pulling apparatus of claim 2, further comprising hydraulics to operate the outer ram.

4. The tube stub pulling apparatus of claim 2, further comprising an electric motor to operate the outer ram.

5. The tube stub pulling apparatus of claim 3, wherein the hydraulics also operate the inner ram.

\* \* \* \* \*